Dec. 26, 1950          C. L. HOBBS          2,535,633

DEVICE FOR AID IN DRILLING OPHTHALMIC LENSES

Filed Oct. 25, 1947

INVENTOR
CLARENCE L. HOBBS
By Robert B. Terry
ATTORNEY

Patented Dec. 26, 1950

2,535,633

UNITED STATES PATENT OFFICE 2,535,633

DEVICE FOR AID IN DRILLING OPHTHALMIC LENSES

Clarence L. Hobbs, St. Louis, Mo.

Application October 25, 1947, Serial No. 782,066

2 Claims. (Cl. 33—174)

This invention relates to improvements in devices for aid in drilling ophthalmic lenses, and more particularly to a protractor, gauge, jig or the like, to enable correct and accurate location of the opening or openings in an ophthalmic lens, for receiving the fastening element by which the elements of the frame or mounting are secured to the lens. In its most complete form, the device further includes improved and advantageous means, not only for locating the center of such an opening, but for marking such location on the lens, whereby to obviate error in drilling.

The design objective leading to present improvements arises particularly but not exclusively from the fact that many modern rimless eye glass lenses are irregular in shape, edge contour or both, which fact enhances the difficulty of accurately locating drilled screw openings. This difficulty particularly prevails in most modern mountings wherein the mounting straps for the temple pieces are secured to the upper portions of the lenses, distinctly above the horizontal center line. An examination of numerous lenses, frames and mountings prevalently offered to the trade indicates that in a preponderant proportion of the completed assemblies, the screw apertures through the lenses are inaccurately located, thus resulting in readily apparent disparities in lens position in the frames. In many cases these faults have been found to be so pronounced that the lens is improperly aligned or focused with respect to the eye. It is accordingly a major objective of the present improvements to obviate each of the several difficulties noted, and besides assuring accuracy of location of drilled openings, to effect a substantial saving in time of the assembly operator.

Yet another object of the invention of high importance, is attained in an improved device, the structure of which includes a base with a lens marking protractor thereon, together with an abutment or other means establishing a base reference line and a lense edge rest, thus positively fixing the area of the protractor, chart, pattern, or gauge over which the lens is to be moved in the determination of the location of drilling points.

A still further important objective of the invention is attained in a device for the purposes noted which is equally adapted to any and all forms of ophthalmic lenses, even those of unusual or odd shapes, for the accurate location of drilling points thereon, and is equally adapted for the determination of correct drilling points by application of the mounting or frame, to the same chart or protractor, when used in combination with a guiding abutment, shoulder or the like.

Yet another and extremely valuable attainment of the present improvements consists in the provision, in functional combination with an abutment and a base, of a unique disposition of graduated indicia such as to provide direct readings, for example, in millimeters, defining to the operator the locus of drilling, and yet such that the spacing of graduations by reason of the angular disposition of the lines or rows thereof, is considerably greater than would be possible with vertical or horizontal rows of graduations and indicia.

As a corollary of the next preceding object, it is now for the first time possible, as a major attainment of this development, to include in an optical prescription an accurate fool-proof indication of drill locations, given in connection with a designation of mounting, or in reference to some known mount or frame.

Still another and valuable objective of the present developments is attained in a unique lens-marking stylus together with manipulating means therefor and means for retracting or advancing the marking device across the lens or like object, together with a positive indication of the extent of such advance or retraction, for example, as by a circular metric scale provided on a control element through which the unit is manipulated.

Yet another object realized in the most complete and advanced form of the device as selected for present disclosure, consists of a provision of a pair of relatively movable straight edge abutments cooperating with a lens drilling protractor or chart, at least one of such abutments being by preference, movable toward and from the other such abutment whereby to provide a lens holder or pocket between the abutments and in which the lens or the like is slidably movable across the protractor or chart.

The foregoing and numerous other objects and advantages will more clearly appear from the following detailed description of a preferred embodiment, particularly when considered in connection with the accompanying drawing, in which.

Figure 1:
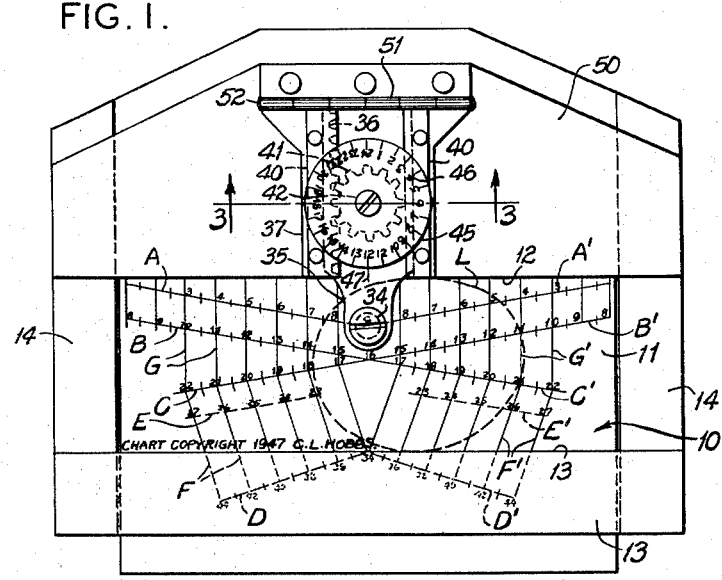
Fig. 1 is a plan view of the assembly showing in dotted lines a lens in position for a determination of its drill location.

Referring now by characters of reference to the drawing, the device includes a base generally indicated at 10, upon the top or uppermost surface of which is provided, as by an imprinted or engraved overlay, a chart designated as a whole at 11, and the arrangement of indicia of and on which will be hereinafter more particularly described. Mounted upon what may be termed the upper portion of the base 10 is a shoulder-forming block or abutment 12, the edge of which adjacent the chart or protractor surface 11, rises vertically therefrom, so as to constitute a straight edge of linear form, and in respect to the chart, as will appear, serving as a base line or reference norm. The abutment 12 may be formed as an integral part of or as a separate element attached to the base 10.

Figure 3:
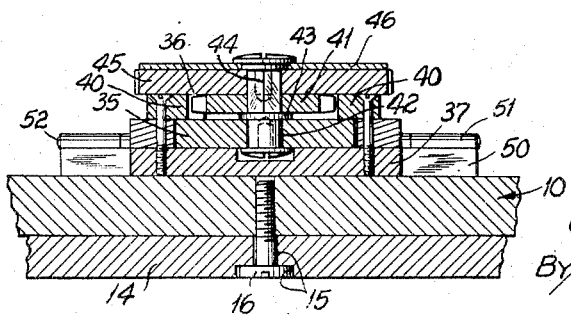
Fig. 3 is a fragmentary vertical section as taken along line 3—3 of Fig. 1, particularly to illustrate certain features of the marker assembly.

A companion, parallel, second abutment, while not strictly necessary for operativeness of the device, is an added convenience and greatly facilitates the use of the device for drill location and marking of eye glass lenses of the usual forms. Such second abutment consists of a strip 13 slidably overlying the surface identified with the protractor or chart 11, and secured at its opposite ends to a movable sub-base element 14 shown as projecting somewhat beyond the lateral confines of the lens supporting surface which bears the protractor or chart. This sub-base member supporting the second or bottom abutment 13, is slidably and guidedly movable with respect to the base proper 10; provision for this relation consisting of a slot formed centrally of the member 14 as indicated at 15, and extending through which is an assembly screw 16 threadedly engaging an aperture therefor in the base member 10. It will appear, particularly from Fig. 3, that the slot 15 is of stepped width, the lower portion being adapted to accommodate the head of the screw 16 while an innermost portion is somewhat more narrow and will receive with relative movement, the shank of the screw just beyond the head thereof. A pair or any desirable plurality of the screws and slots may be provided, only one being shown in the interest of clarity of illustration. Only a moderate range of relatively sliding movement need be provided for between the parts 14 and 10, this range of movement corresponding to the differences in vertical dimension or height, of the various forms and sizes of ophthalmic lenses.

Proceeding now to a description of the protractor chart or pattern of indicia to indicate with precision the exact locations for lens drilling, the significant lines or rows of indicia will be indicated by reference letter, in order to avoid confusion between the numerical graduations of the protractor, and other reference numerals. As a preliminary observation it will be noted that the preferred pattern of the whole chart may be divided into right hand and left hand portions, and that these two portions are similar, in fact identical, except for right and left reversal on opposite sides of an imaginary, or real if desired, center line from top to bottom of the chart; it being understood for further description that the top margin of the chart is that identified with the abutment, or shoulder 12, and the bottom being the opposite margin identified with the shoulder of movable abutment 13, when in its lowermost position.

With further reference to the chart or protractor 11 there is observed a row of numerically designated indicia numbered successively from the left toward the center line, at 3 to 9 inclusive, this line being indicated at A. The corresponding line A' extends from the center line toward the right hand margin of the chart and is reversely graduated. Parallel, respectively, to the lines A and A', are lines B and B', these being graduated along line B, from 8 to 16 approaching the top-to-bottom center line, and reversely graduated from 16 toward 8 along the line B'.

On each side of the center line, are a pair of similar, somewhat shorter rows of reference indicia, these being indicated at C and C' on the left and right hand sides respectively, these being graduated as to line C, from 22 reversely to 16, coincident with the center line, and from 16, by direct reading, through an outermost point designated by numeral 22. A fourth series of cross lines are indicated at D and D', the line D being approximately parallel to line C, and D' approximately parallel to C', the latter pair being graduated with appropriate numerical indications, reversely from left to center line in the case of line D, beginning with 44 and extending through the point indicated at 34 coincident with the center line, the corresponding but direct reading series of indicia being applied to line B'. In the description heretofore and following, it should be understood that it is not strictly necessary that actual lines be employed, although the arrangement as shown is highly advantageous and greatly facilitates arriving at a correct drill location, in following the successive graduations until the proper drill point is reached. It is necessary and essential that the indicia be arranged in linear rows.

Yet another series of linearly arranged indicia is indicated at E on the left hand side of the protractor and at E' on the right hand side as shown by the drawing. These are graduated from innermost points 23, outwardly in each direction to outermost points designated at 27. A series of vertical lines F on the left hand side, and a similar series F' on the right hand side of the chart, will be seen to connect the indicia along lines D and D', with corresponding half-value indicia along lines C and C' respectively, while extending substantially vertically from the edge of the latter are series of substantially vertical lines G and G'. These lines extend in the preferred form, upwardly to the top margin of the chart or protractor and their intersections with the several substantially transverse lines, define the drilling points, at least in certain cases, as will hereinafter appear.

Apart from actual application of a mark of some sort, for example on a lens to be drilled, the structure as thus far described, is fully operative for the accurate determination of drilling points. It will now have appeared that the several lines A, A', B, B', C, C', D and D', as well as E and E' are all located, whether true lines or rows of indicia, at a distinct substantially acute angle to the parallel abutments of members 12 and 13. It will now have appeared also that the proper selection of indicia and graduations along such an acute angle reference line, enables, particularly when millimetric measurements are employed, a much wider, easy-to-read and a better direct reading arrangement than would be possible with any pattern of vertical and horizontal lines characterized by direct true metric indicia and graduations. This result is attained, as will now appear, since the lines last enumerated are arranged in effect each as the hypotenuse of a right triangle characterized by a short vertical side, the base of which triangle is coincident with or parallel to the base line or abutment margin such as 12. Thus a greater spread of indicia is provided than would be possible when using closely grouped graduations with obviously greater likelihood of error. In the example shown by Fig. 1, the rows of indicia or lines referred to as acute angled, are disposed at ten degrees, within limits of error, to the abutments. Such angularity is preferred, although as will be obvious from present instruction, some latitude is possible, although by experiments conducted in great number, it appears that this angle is best kept within inclusive limits of the order of five to thirty degrees.

The device as thus far described, including the chart or protractor proper, is susceptible of use with many advantages, in fact, all thereof as heretofore enumerated with the exception of the facilities for marking, as by inking or the like, later to be described. In usage it should be noted that the lens supporting surface may be actually or arbitrarily divided along a top to bottom (sometimes called vertical) center line which line is coincident with the points 9, 16 and 34. The indicia and graduations to the left (Fig. 1) of the center line are designated as the left side of the chart, and on the opposite side of the center line as the right side of the chart or protractor. It should be noted however, that best practice consists in disposing a lens, assuming it to be for example, of the usual concavo-convex character, with its convex side uppermost, and with the median point of its uppermost margin against abutment 12 in such manner that the long axis of the lens, which may be referred to as its horizontal axis, lies parallel to the shoulder provided by members 12 and 13. A right lens is placed over the left side of the chart, and for determinations of drilling point or points on a left lens, the latter will be disposed on the right hand side of the chart as shown by Fig. 1. The drilling point is easily and accurately determined as the point of intersection of the lines selected according to their graduations, it being noted that on the substantially transverse, acute-angled lines the numbers representing millimetric values indicate the distance from the top of the lens to the graduated point identified with the nearest intersection. In the case of certain of the graduations, crowding of figures is intentionally avoided by the provision of unnumbered alternate intersections, intervening those provided with numerical designations. In many cases as will appear, the unnumbered intersections are formed by the short lines, representing half spaces.

In practice the width of the lens will usually first be determined, as may be done by application of the readings along lines D or D', whichever applicable, it being noted that these lines or rows of indicia are broken. They are presented at an acute angle to the abutments or base lines, and are convergent toward and divergent from a point on the vertical center of the chart. The center intersections are numbered from 16 to 22 in opposite directions from the center line of the protractor, these intersections lying along lines C and C', one of which will be applicable to a right hand and the other to a left hand lens. As above briefly referred to, the lens may be slidably moved to right or left over the protractor, with its edge in abutting engagement with the shoulder of element 12, the lens being thus moved in either direction over the appropriate half of the whole chart, until the bottom of the lens bisects an intersection. If, for example, the intersection thus bisected by the lower lens margin be #40, the width of the lens has thus been determined as 40 millimeters, such reading being taken along line D or D'. After thus having determined the lens width, the adjacent line F or F', of a generally vertical trend, is followed to the next reading thereabove, being #20. This, then, represents the center of the lens, and the point indicated by numeral 20 is located at the angle where one of the lines F or F' joins the adjacent line G or G' thereabove, whence it is directed toward the abutment formed by the shoulder on element 12.

It is usually the case, particularly in present day mountings, that the drill point is desirably located say three or four millimeters above the center line of the lens. If, as will be known or prescribed, or determined from the mounting when applied to the protractor, it is desired to locate the drill point three millimeters above center, the operator begins at the intersection designated at 20, and counts three intersections to the left or right, as the case may be, along line C or C'. In this example, the eye will be led directly to the point indicated at 17. This provides the exact locus of center of the drill in a highly accurate manner and with virtually no error. Other drill points are equally simply determined.

In case it is desired to match a former drilling, when replacing a broken lens, the latter is placed on the chart with its upper edge in abutment with element 12 and its drilling point determined as above described, and a new lens marked in coincident manner.

It should be noted as entirely possible and fully practical, to begin a reading for a drilling point say on line C, continuing same to the intersection thereof with line B, thence in an opposite direction along line B, to attain the desired drill point. The same is true except with opposite directions of eye movement, as to the relation between lines C' and B'.

Only occasional use will be made of the relatively short broken lines identified with readings 23 to 27. These are applicable only to very unusual sizes or shapes of lenses rarely encountered, and are included largely for completeness. They are intentionally formed up of short broken lines in order to obviate confusion of the intersections thereon, with the center intersections. It should be noted that many of the so-called high bridge or numount types of frames made by various manufacturers, ordinarily present considerable difficulty in the accurate location of lens drilling points. With the present arrangement such drill points may be readily and easily determined with a considerable saving of time, and great improvement in degree of drilling accuracy.

The device as described is also applicable with many advantages to the determination of proper locus of lens drilling points, as determinable from the frames or mountings. Such determinations may be made very similarly to the steps heretofore described in reference to lenses, the frame or mounting being located on the surface or rest 10, and over the chart or protractor, with the top of the frame in abutment with the shoulder of member 12. The selected side of the frame, i. e. right or left, is moved across the applicable side of the chart until the registering screw apertures of the frame are brought into coincidence with one of the intersections on lines B or C, or their opposite counterparts. This provides a direct indication of the correct drilling point on the lens, in order properly to fit the frame or mounting with the optical axis of the lens properly located according to requirements of the individual user. As thus far described, the markings may be made in any suitable manner, as by an ink point manually applied to the lens to indicate drill center locus.

In the most advanced form, a marking device is employed in the interest of further saving of time, and to assure entire correctness of drill center location. A preferred arrangement for this purpose consists of a stylus exemplified as a ball-point marking implement, the marking point of which is indicated at 30, carried in the lower tapered extremity of an inking reservoir consisting of a cylindrical container 31 provided with a chamber 32 for any suitable marking material, for example, a semi-solid suitable for use with and application to the ball 30.

Enclosing a part of the cylindrical reservoir, which serves as a marking plunger, is a coil compression spring 33 abutting at its outer end, a shoulder formed by a large diameter screw filler cap 34, and at its opposite end abutting a stylus-supporting arm 35, the arm being apertured near its free extremity so as slidably to receive the reservoir 31. It will now appear that a downward or depressing movement of the plunger will serve to bring the ball 30 supplied with ink, downwardly upon the surface of the lens L to indicate the drill point previously determined.

From the examples heretofore given in the determination of drill locations on the lens, it will have appeared that such markings will in all cases be applied to the lens in a fixed region of the chart or protractor, i. e., along its top to bottom median line. However, it will be noted that the different locations of the markings will vary in their distances above the abutment provided by member 13 and below that established by the base line coincident with the margin of member 12. Thus provision is made for an advancing or retracting movement of the arm 35, so as to vary the position of the stylus along the top to bottom center line. While a simple slidable relation may be established by the arm and a support therefor fixed on the base, a more accurately controllable mechanism for this purpose consists in the provision of a fixed rack 36 formed along the inside surface of a strip 40, later described. The arm 35 is constrained to a carefully guided horizontal movement along a fixed line and in a fixed horizontal plane in reference to the base, inasmuch as the arm is slidably supported by a normally fixed member 37 (Fig. 3) and is guidedly held downwardly against the member 37 although movably thereover, by retaining strips 40 marginally overlying the arm. A convenient, low cost and accurate provision for actuation of the rack 36 includes a rotatable pinion 41 one side of which engages the teeth of the fixed rack 36. The pinion is rotatably mounted and journalled in the arm 35 as through a pin 42 provided with a shoulder or washer immediately above its journal portion and indicated at 43. Above the latter the pin 42 is formed to provide a squared shank 44 which extended through a similar opening, secures the pinion 41 against angular displacement with respect to the pin 42. Above the pinion and also similarly engaging the squared portion 44, is a circular hand wheel, conveniently provided with a milled periphery, the hand wheel being indicated at 45 and surmounted by a circular and circularly graduated chart 46, the indicia of which are evenly spaced, numerical in nature, preferably of millimetric significance, and each provided with an index mark selectively brought into register with a fixed index mark 47 on the arm 35 (Fig. 1).

The rack 36 being fixed, it will now appear that rotation of the hand wheel 45 will, through engagement of the pinion 41 with the rack, serve to advance or retract, according to the direction of rotation of the hand wheel, the arm 35 carrying the marking device. If for example a center line of the lens has been determined in the manner heretofore described, and it is desired to move the marker a certain distance above or below the line, the hand wheel 45 is rotated in the desired direction and to an extent indicated by the number of graduations traversing the fixed index mark 47, as which time the marker will be correctly positioned over the center of opening to be drilled. The plunger is then depressed to mark the lens.

Figure 2:
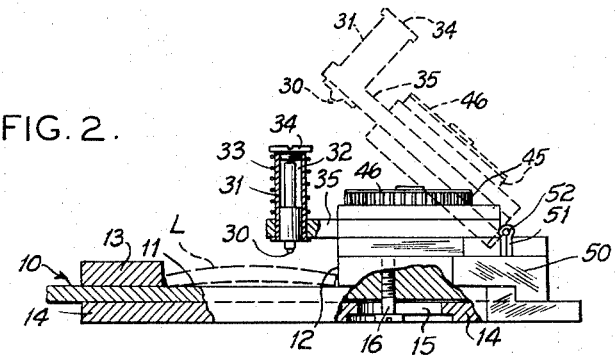
Fig. 2 is a vertical sectional elevation, the sectional portions of which are taken substantially in a median plane from top to bottom of the device of Fig. 1.

A further added advantage and refinement consists in a provision enabling movement of the marker, arm and actuating mechanism therefor, entirely beyond its normal position above the protractor or chart area. This may be done without disturbing the adjusted setting of the marker, as is desirable in the case of repeat marking of similar lenses. The last noted provision consists in hingedly mounting the entire marker assembly to a relatively raised portion 50 formed integrally with or attached to the base structure. It is within suitable recesses formed laterally of the portion 50 in which the side elements of portion 14 are guidedly received, as indicated by the dotted lines at the right and left hand side of Fig. 1. Attached to the upper surface of the deck 50 is a hinge indicated at 51 and including a hinge pin 52, one of the hinge elements being fixed to the deck 50 and the other being secured to member 37, whereby the entire marker assembly may be raised at least to the height shown by dotted lines in Fig. 2, and preferably farther to bring the arm 35 to a vertical position, or therebeyond, in which position it will be selfretained in an out-of-action position. A downward movement of the marker assembly about the hinge axis identified with pin 52, again restores the marker to the operative position such as shown by full lines in Fig. 2.

It will now have appeared that the device as described enables a quick, accurate, and workmanlike location and indication of lens drill marks, and may also be used to advantage in connection with the mountings, as described, and that in all other ways it fully attains each of the several objectives heretofore noted, as well as numerous others implied from the description of parts and manner of use of the assembly.

Although the invention has been described by making detailed reference to a presently preferred embodiment, the detail of description is to be understood solely in an instructive, rather than in any limiting sense, numerous variants being possible within the scope of the claims hereunto appended.

I claim as my invention:

1. In a device for the general purposes described, a base provided with a top planar surface constituting a lens rest, a pair of abutments each providing a linear shoulder normal to the base, one of said abutments forming an upper shoulder extended across the full horizontal width of the base and being fixed with respect to the base, and the other abutment and base being relatively movable, and the second said abutment forming a shoulder for engaging the lower margin of a lens on the lens rest, and being movable toward and away from the first said abutment, and a series of linearly arranged graduated indicia on the lens supporting surface of the base, said indicia being presented in right and left hand, symmetrically related series, the lines of indicia of each of said series being located in acute angled relation to the abutments, and those of the companion series converging toward a top-to-bottom center line on the lens supporting surface, each of said abutments being of a horizontal length to provide a shoulder slidably engaged by a lens, which shoulder extends laterally of each side of the base, and exceeds twice the width of a lens, a sub-base operatively attached to the base for slidable guided movement with respect thereto, the movable abutment being attached to the sub-base and guidedly engaging the side margins of the base.

2. In an ophthalmic drill locator, a base of planar form, a top surface of which constitutes a flat support for a lens or frame, a linear abutment piece projecting above the upper region of the planar area of the base and being fixed thereto, the base and abutment piece each being of a width in excess of twice the maximum horizontal dimension of usual ophthalmic lenses, a second element forming a linear abutment adapted for engagement by the lower margin of a lens, said second element being movable toward and from the first said abutment piece, the abutment surfaces of said elements being engageable respectively by the upper and lower margins of a lens on the support, so that the lens may be slidably moved across the base over a distance exceeding twice the horizontal dimension of the lens, the base being provided with a chart on its said lens-supporting surface which chart is characterized by lines of graduated indicia, each such line being located at a distinctly acute angle to the linear abutments, and which angle is within a range of the order of 5 to 30 degrees, a sub-base having slidable engagement with the aforesaid base, a slot in the sub-base, a headed pin element extended through said slot and attached to the base, whereby to determine limits of relative movement of the base and sub-base, the second said linear abutment being extended at each of its ends beyond the lateral confines of the base, and the sub-base similarly extending laterally beyond said base, the sub-base and second said linear abutment carrying therebetween, and in slidable engagement with the lateral margins of the base, connecting portions through which the second said abutment is movable with the sub-base and slidable relative to the base in a manner to enable ophthalmic lenses and frames of varying vertical dimension, to be held between the linear edge portions of the abutments, the indicia comprised by the chart on the lens supporting surface of the base being arranged thereon in two reversely related, symmetrical groups, and the said length of the linear abutments being such as to enable a lens to be slidably moved fully across each, and from one to the other of the said two groups of indicia.

CLARENCE L. HOBBS.

REFERENCES CITED

The following references are of record in the file of this patent:

UNITED STATES PATENTS

| Number | Name | Date |
|--------|------|------|
| 803,794 | Starbuck | Nov. 7, 1905 |
| 1,292,121 | Stead | Jan. 21, 1919 |
| 1,336,040 | Mathewson | Apr. 6, 1920 |
| 1,528,138 | Watson | Mar. 3, 1925 |
| 2,086,765 | Burrows | July 13, 1937 |
| 2,088,914 | Long | Aug. 3, 1937 |
| 2,376,601 | Kiesel | May 22, 1945 |
| 2,413,198 | Stewart | Dec. 24, 1946 |